3,468,870
METHOD OF PURIFYING INSULIN EMPLOYING CARBOXYMETHYL CELLULOSE
Geoffrey Howard Smith, Derek Thomas, and Andrew Harklestone Hall, London, England, assignors to Burroughs Wellcome & Co., Inc., Tuckahoe, N.Y., a corporation of New York
No Drawing. Filed Feb. 17, 1966, Ser. No. 528,061
Claims priority, application Great Britain, Feb. 22, 1965, 7,466/65
Int. Cl. A61k *17/02, 17/04;* C07g *7/00*
U.S. Cl. 260—112.7                            9 Claims

ABSTRACT OF THE DISCLOSURE

An improved method of preparing insulin using elution techniques. In particular, this invention is directed to the steps of contacting an extract of insulin containing an organic solvent with carboxymethyl cellulose adsorbent and thereafter contacting insulin containing absorbent with lipid solvent.

---

This invention relates to the preparation of insulin.

In the usual process for the preparation of insulin, the pancreatic tissue of cattle or pig is extracted with an acidified aqueous alcohol or acetone. The extract may then be concentrated in vacuo to remove the organic solvent and also to separate lipids thus rendered insoluble; alternatively, the solvent and lipids may be extracted with a solvent immiscible with water. The crude insulin is then precipitated with sodium chloride from the aqueous concentrate, and further purified by precipitations at its isoelectric point, around pH 5.3, or by crystallization from various buffer systems in the presence of zinc. It has been presumed that considerable losses occur particularly in the early stages of the process, but attempts to eliminate them and improve the yield have not yet met with significant success.

It has already been suggested in Japanese Patent No. 6,492/63 that crude insulin can be purified by adsorption from an aqueous solution onto carboxymethyl cellulose at a pH between pH 2 and 4, and subsequent elution with an acid or salt solution. The adsorption of insulin from an aqueous system onto carboxymethyl cellulose at a pH about 3.3 has also been described by L. F. Smith, Biochim. Biophys. Acta, 1964, 82, 231–236. These methods, however, suffer from the disadvantage that they are not capable of compensating for the losses which may have occurred earlier in the process, and do not themselves provide conditions for efficient extraction.

According to the present invention there is provided a method for the preparation of insulin, comprising the steps of contacting an extract being a partially aqueous solution of insulin, which contains predominantly one or more organic solvents, such as a lower alcohol or acetone, at an indiacted pH between about pH 4.1 and 6.3 with carboxymethyl cellulose adsorbent preadjusted substantially to the pH of the solution, contacting the adsorbent, which contains the insulin and is freed from the residue of the extract, with a lipid solvent and eluting the insulin from the adsorbent with an aqueous solution containing acid or salt. Preferably the contacting of the extract with the adsorbent is carried out at an indicated pH between about pH 4.5 and 5.9.

For the purpose of the present invention the indicated pH of a solution which contains predominantly organic solvents is determined and thereby defined by measuring the apparent pH with a glass electrode against a calomel reference electrode previously calibrated with aqueous standard buffers.

The present method can advantageously be used to purify directly the crude extract of insulin from the pancreas, which contains predominantly an organic solvent, usually 60 to 80% ethanol acidified wih hydrochloric, sulfuric or phosphoric acid, and is available at about pH 3. Before contacting the extract with carboxymethyl cellulose, it is essential to adjust the pH, for instance with ammonia, to a higher value as hereinbefore specified. If it is necessary to filter the extract at a pH even higher than pH 6.3 before the adsorption step, the clear solution has to be subsequently readjusted with an appropriate acid to the pH required for adsorption.

Any type of carboxymethyl cellulose adsorbent, which is insoluble in water, may be used for the purpose of the present invention. A carboxymethyl cellulose preparation, which is sold as CM–11 (formerly known as CM–70) Whatman (trademark) and manufactured by Messrs. W. & R. Balston Ltd., with a theoretical capacity of 0.7 mequiv./g. has been found satisfactory. However, other grades or brands, such as carboxymethyl cellulose manufactured by Serva Entwickungslabor. Heidelberg, Eastman-Kodak, or Bio-Rad Laboratories, California (Cellex), may be found equally convenient for use.

It is important that the ionic condition of the adsorbent be preadjusted substantially to that of the solution or extract from which the insulin is to be removed. Usually this adjustment is carried out by suspending the adsorbent in a solution of an acid in a solvent system similar to, or identical with, the solution or extract of insulin and adding ammonia until the desired pH is reached. Preferably the acid used for this purpose is a weak acid having some buffer capacity or a polyvalent acid, such as phosphoric or citric acid.

The adsorption of insulin from the solution may be carried out in a batchwise manner by using one or several portions of the adsorbent and separating these portions from the solution after equilibrium has been attained. This is repeated until no more insulin can be detected in the solution. When using the above "CM–11" preparation, the equivalent of about 20 to 40 g. (dry weight) per 100 g. pancreas has been found sufficient. Alternatively, the adsorbent may be used in the form of a column or sheet or layer and the adsorption, or the subsequent elution, may be carried out by the appropriate techniques well known in the field of chromatography.

After the insulin has been retained on the carboxymethyl cellulose, the lipids and other impurities can advantageously be removed by a lipid solvent which is innocuous to insulin and does not elute the insulin from the adsorbent. Examples for such solvents are chloroform, dichloroethylene, dichloromethane or the lower alcohols with or without some water. Although most of these solvents are suitable for the purpose, those which are miscible with water, in particular ethanol, are preferred. The water content of the ethanol may, for instance, be up to 35%.

The bulk of the residual solvent is conveniently removed by aeration or rinsing with water.

The elution may, for instance, be carried out simply with a solution of 0.1 N-hydrochloric acid, or with a series of successive treatments with acid or salt solutions of increasing strengths to obtain fractions of various purity. A solution of insulin obtained by elution is not only readily suitable for further purification by conventional methods, but the yield or quality of the crystalline insulin eventually recovered therefrom are, on average, significantly higher or superior to those hitherto attained. The spent adsorbent may be regenerated and used again as there is no indication that carboxymethyl cellulose accumulates enzymes making the adsorbent unsuitable for repeated use or necessitating the preheating of the extract, as it is known for alginic acid adsorbent (E. Jorpes, et al., Acta Chemica Scandinavica 1960, 14, 1779).

If the present invention is applied to the original insulin containing extract of the pancreatic tissue, a considerable simplification and improvement of the process economy can be attained, as compared to the conventional methods used in industry, in addition to the above advantage.

The following examples illustrate the invention.

EXAMPLE 1

Carboxymethyl cellulose (CM–11, Whatman, 100 g.) was suspended in water, allowed to settle, and the "fines" were removed by repeated decantation. The adsorbent was then cycled through its sodium and hydrogen forms by suspending it alternately in 0.1 N sodium hydroxide and 0.1 N hydrochloric acid. Excess acid was then removed by washing with distilled water to neutrality. Subsequently it was suspended in neutral 62.5% v./v. ethanol and allowed to equibirate for approx. 30 min. The alcohol was removed by filtration on a sintered glass funnel and the adsorbent suspended in 62.5% v./v. ethanol, containing phosphoric acid to pH 3.1. The suspension was cautiously adjusted to pH 5.9 (glass electrode against a calomel reference electrode) by addition of aqueous 5 N ammonia. It was allowed to stand until the pH remained constant, the pH being readjusted with 5 N ammonia occasionally, if necessary. The buffered adsorbent was then filtered off, dried first by aeration and then at 45° C. for 30 min., and stored in a closed container.

Cattle pancreas was extracted with 80% v./v. ethanol, containing phosphoric acid (Sp. Gr. 1.65; 6.3 ml./l.), which gave an extract (175 ml. to each 50 g. pancreas) having a pH of about 3.3. This was adjusted to pH 5.9 with 5 N ammonia and filtered. To each of the 225 ml. portions of the solution so obtained (equivalent to 25 g. pancreas) was added buffered adsorbent (containing 12 g. dry weight of CM–11), and the mixture was periodically stirred for 90 mins. and then filtered through a sintered glass filter.

The adsorbent collected on the filter was washed with absolute ethanol (3 times 100 ml.) and was dried by aeration at room temperature.

While still on the filter, the dry adsorbent was eluted with 0.1 N hydrochloric acid (3 times 100 ml.), the eluates were combined and the crude insulin was recovered in the form of picrate, converted into hydrochloride and precipitated at its isoelectric point, pH 5.3. The product was then dried and assayed by paper chromatography.

The yields obtained from 24 similar experiments, using in all six different samples of pancreas, were each compared with the yield obtained by the control process, which comprised an extraction of the aqueous ethanolic extract with diethyl ether followed by an isoelectric precipitation and assay as above. (See S. S. Randall, Biochim. Biophys. Acta, 1964, 90, 472.) At the best, the yield of insulin was 60% higher than that of the control process, and at the worst 47% higher, the mean increase being 56% with an estimated standard error of the mean of ±2.2%.

EXAMPLE 2

In a series of further experiments the ethanolic extract was processed according to the method described in Example 1, only that the adsorbent was suspended in 62.5% v./v. alcohol, adjusted to pH 5.9 with hydrochloric acid, after cycling through its sodium and hydrogen forms and removal of excess acid.

The yields obtained from 28 experiments, using six samples of pancreas, were 11 to 31% higher than those obtained by the control process.

EXAMPLE 3

In a series of further experiments the ethanolic extract was processed as in the method described in Example 1, only that the crude insulin obtained by precipitation at its isoelectric point was further purified by crystallization in a citrate buffer at pH 5.8 in the presence of zinc.

The crystalline insulin obtained from 6 experiments, using two samples of pancreas, had an average potency of 23.5 I.U./mg. as against the average of 22.1 I.U./mg. for the control process. The yields were 40 to 47% higher than that of the control process.

EXAMPLE 4

Carboxymethyl cellulose (CM–11, Whatman, 100 g.) was suspended in 0.1 N aqueous sodium hydroxide (3 liters) and was stirred for about 15 min. After filtering and washing with water, the adsorbent was resuspended in 0.3 M phosphoric acid, stirred for a further 15 min. and again filtered wand washed with water. The adsorbent, now in the acid form, was suspended in 64% v./v. ethanol and the suspension was adjusted to pH 4.5 with phosphoric acid. It was allowed to stand until the pH needed no more readjustment, and the buffered adsorbent was filtered off and air dried overnight.

The adsorbent so prepared was stirred with the 65% v./v. ethanolic extract (5 liters) of ox pancreas (750 g.), containing phosphoric acid (approx. 24 g.), after the removal of a precipitate at pH 5.9 and readjustment to pH 4.5. When no more polypeptide was detectable by the addition of picric acid to the supernatant solution, the adsorbent was filtered, washed with ethanol containing 5% methanol (3 times, 500 ml.) and air dried overnight.

The insulin was eluted from the adsorbent with 0.1 N hydrochloric acid (3 times, 1 liter). The eluate was then treated with a saturated solution of picric acid (4.5 liters) and the separated picrate was converted into the hydrochloride with hydrochloric acid in acetone. The hydrochloride of insulin was then further purified by the conventional precipitation at the isoelectric point and crystallization in the presence of zinc chloride, both well known methods in the art. The yield obtained was 4700 I.U. crystalline insulin/kg. pancreas.

When another sample of the same ethanolic extract was evaporated under reduced pressure, followed by filtration of fat, picration and crystallization of insulin as above, the yield was 3100 I.U. crystalline insulin/kg. pancreas.

EXAMPLE 5

In a series of further experiments the ethanolic extract was processed according to the method described in Example 4, only that the adsorbent and the solution were both adjusted to pH 3.5 and 7.5 respectively, and the yields were 80% and 85% on the yield obtained by the conventional control process described in the second part of Example 4.

EXAMPLE 6

In a series of further experiments the ethanolic extract was processed according to the method described in Example 4, only that the lipid solvent used for washing the adsorbent was chloroform, dichloromethane, dichloroethylene, methanol, n-propanol or isopropanol, respectively. The yields obtained were all higher than that obtained by the conventional control process described in the second part of Example 4.

EXAMPLE 7

In a series of comparative experiments extracts of 100 g. pancreas with 80% v./v. ethanol containing phosphoric acid as in Example 1 were divided into two equal portions. The first portions were processed and the products assayed for insulin by paper chromatography according to the method described in Example 1.

The second portions were individually adjusted to pH 5.9 with 5 N ammonia after addition of an equivalent of 20 g. dry weight carboxymethyl cellulose (CM–11), previously equilibrated to pH 3.1 and the mixture left to stand for 90 min., with occasional stirring and readjustment to pH 5.9. The mixtures were then filtered, washed, eluted etc. as described in Example 1.

The results were as follows:

| Experiment No. | Yields (international units of insulin/g. pancreas) | |
|---|---|---|
| | Procedure as in Example 1 | Procedure without filtration at pH 5.9 |
| 1 | 5.8 | 7.1 |
| 2 | 4.7 | 6.7 |
| 3 | 5.0 | 7.5 |
| 4 | 5.1 | 9.0 |
| Mean yield ± SEM | 5.1±0.17 | 7.6±0.50 |
| Mean potency of crude product [I.U./mg.] | 11.8±0.7 | 6.3±0. |

EXAMPLE 8

Carboxymethyl cellulose (CM–11, 10 g.) which had been treated to remove fines was suspended in a 0.1 N sodium hydroxide solution (250 ml.). The suspension was poured into a chromatographic column diameter 1 in.), care being taken to avoid forming layers by stirring the suspension with a glass rod in the column.

Excess sodium hydroxide solution was drained out of the column, as much as possible, and 0.03 M phosphoric acid (250 ml.) and subsequently an alcoholic ammonium phosphate buffer (500 ml.) were run through the column at a rate of 10 ml./min.

The alcoholic ammonium phosphate buffer had been prepared by acidifying 6% w./v. ethanol with phosphoric acid to a molality of 0.03 M, adjusting the pH to 4.5 with a few drops of 35% ammonia per 500 ml. solution, and stirring the solution to deaerate for 30 min.

An alcoholic extract of pancreas (1 liter, containing approx. 4.8 g. phosphoric acid) was readjusted to pH 4.5 with a 10% phosphoric acid solution, after the removal of insolubles at pH 5.9.

The extract was run through the above prepared column at a rate of 1.5 ml./min. The adsorbent was then washed with 65% neutral alcohol (250 ml.) industrial absolute alcohol (250 ml.), containing 5% methanol, and distilled water (500 ml.), at a rate of approx. 10 ml./min.

The insulin was eluted from the column with 0.1 N hydrochloric acid at a rate of 1.5 ml./min., the eluate being collected in 5 ml portions and the protein content measured by means of U.V. adsorption at a wavelength of 280 m$\mu$. The peak occupied an elution range of 20 ml. The combined solutions of this range were treated with a saturated solution of picric acid (30 ml.), and the precipitated picrate was worked through to crystalline insulin according to the method described in Example 4. The result showed that about 80% of the insulin contained in the alcoholic extract was present in the eluate.

In a further experiment the extract and column were adjusted to pH 5.0, but otherwise the adsorption and elution was carried out as described above. 90% of the insulin contained in the alcoholic extract was present in the eluate.

EXAMPLE 9

Carboxymethyl cellulose (4 kg., which had been treated to remove fines, was suspended in 0.1 M sodium hydroxide (30 liters). After stirring, the slurry was poured into a column (6 in. in diameter, 5 ft. high). The sodium hydroxide solution was then drained down to the level of the adsorbent, and 0.03 M phosphoric acid (60 liters) was run through at a flow rate of 25 liters/hour.

65% w./v. ethanol (150 liters), acidified with phosphoric acid to have a concentration of 0.03 M, was adjusted with 35% ammonia to pH 4.8. The buffer solution so obtained was run through the column at a rate of 25 liters/hour. The pH of the effluent buffer solution should be 4.8 at the end.

An alcoholic extract of pancreas (300 liters), as obtained in Example 8, was adjusted to pH 4.8 with phosphoric acid after the removal of the pH 5.9 precipitate, and was run through the column at a rate of 25 liters/hour. The column was then successively washed with 65% ethanol (50 liters), 85% ethanol (50 liters), and water (100 liters), all at a rate of 25 liters/hour.

The insulin was eluted from the column with 0.1 M hydrochloric acid at a flow rate of 8 liters/hour, and the protein containing band was detected by U.V. absorption at the wavelength of 280 m$\mu$ and collected.

The eluate was assayed, and 92 to 100% of the insulin originally present in the extract was shown to be recovered in the eluate.

What we claim is:

1. In a method for the purification of insulin which includes eluting the insulin from an adsorbent with an aqueous solution containing acid or salt, the improvement comprising the steps of (a) contacting an extract of insulin in an aqueous-organic solution which contains a solvent selected from the group consisting of acetone and the lower alkanols at a pH of 4.1 to 6.3 with a carboxymethyl cellulose adsorbent adjusted to the pH of the solution, and (b) contacting the adsorbent which contains the insulin with a lipid solvent selected from the group consisting of chloroform, dichloroethylene, dichloromethane and lower alcohols.

2. In a method according to claim 1, wherein the carboxymethyl cellulose has a theoretical capacity of about 0.7 milliequivalent per gram.

3. In a method according to claim 1, wherein the contacting of the extract with the adsorbent is carried out at an indicated pH between about pH 4.5 and 5.9.

4. In a method according to claim 1, wherein the extract contains 60 to 80% ethanol.

5. In a method according to claim 4, wherein the alcoholic extract is adjusted to pH 5.9 prior to adsorption and the precipitated insolubles are separated.

6. In a method according to claim 1, wherein the lipid solvent is selected from the class consisting of ethanol and aqueous ethanol containing up to 35% v./v. water.

7. In a method according to claim 1, wherein the elution is carried out with an aqueous solution of an inorganic acid selected from the group consisting of hydrochloric, sulfuric and phosphoric of 0.1 N strength.

8. In a method according to claim 1, wherein the eluate is treated with picric acid and the precipitated insulin picrate is then treated with hydrochloric acid in acetone.

9. In a method according to claim 1, wherein the insulin is selected from the class consisting of pig and cattle insulin.

References Cited

UNITED STATES PATENTS

| 1,669,328 | 3/1928 | Dudley | 167—75 |
| 2,878,159 | 3/1959 | Jorpes et al. | 167—75 |
| 2,897,117 | 7/1959 | Romans | 167—75 |
| 3,069,323 | 12/1962 | Volini et al. | 167—75 |

FOREIGN PATENTS

38/6492   1963   Japan.

OTHER REFERENCES

Smith: Biochim. Biophys, Acta 82, 231–236 (1964).

LEWIS GOTTS, Primary Examiner

MELVYN KASSENOFF, Assistant Examiner

U.S. Cl. X.R.

8—4, 29, 42, 43, 50; 106—22, 288; 117—138.8, 148, 260—37, 146, 147, 157, 163, 193, 197, 200, 205, 206